United States Patent

Allen

[15] 3,656,968

[45] Apr. 18, 1972

[54] PROCESS FOR MAKING FOOD SANDWICH
[72] Inventor: Donald F. Allen, Racine, Wis.
[73] Assignee: Ki-Ada of America, Inc., Racine, Wis.
[22] Filed: July 14, 1969
[21] Appl. No.: 841,497

[52] U.S. Cl. .................................................. 99/87, 99/88
[51] Int. Cl. ............................................................ A21d 13/00
[58] Field of Search .............. 99/87, 88; 107/1 F, 1 G, 54 D, 107/19 A, 19 D

[56] References Cited

UNITED STATES PATENTS 1,543,650   6/1925   Lyons .......................................... 99/87
1,589,850   6/1926   Haskell ........................................ 99/87
1,492,603   5/1924   Matson ...................................... 99/87 X

*Primary Examiner*—Raymond N. Jones
*Assistant Examiner*—James R. Hoffman
*Attorney*—Arthur J. Hansmann

[57] ABSTRACT

Preparation of a food sandwich consisting of a filling in a thin-walled bun with a hole extending into the bun along and adjacent to the filling so that flavoring material inserted into the hole will be in contact with the filling. A thin sheet of dough is wrapped around the filling and an adjacent skewer so that one end of the skewer protrudes from the dough. After cooking, the skewer is removed to produce the hole for the flavoring material.

4 Claims, 7 Drawing Figures

PATENTED APR 18 1972  3,656,968
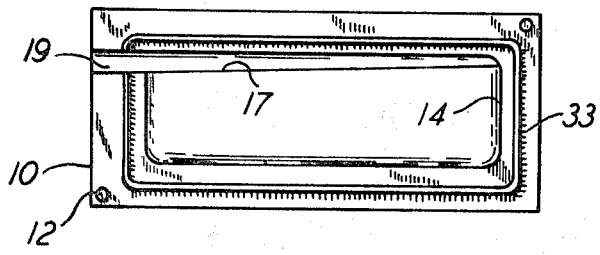
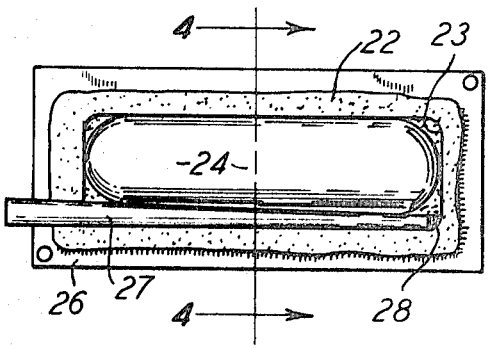
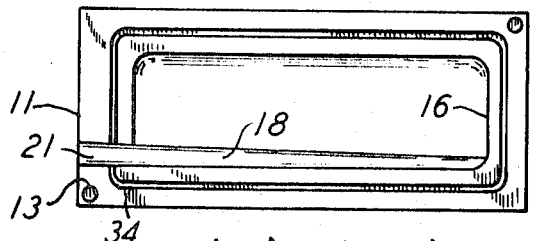
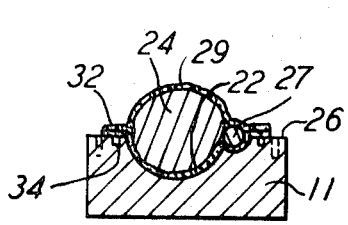
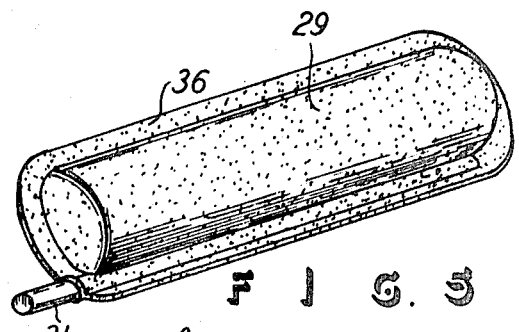
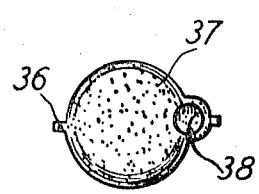
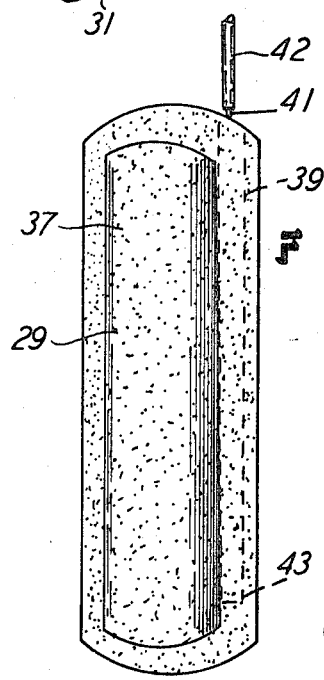
INVENTOR:
DONALD F. ALLEN
ATTORNEY

PROCESS FOR MAKING FOOD SANDWICH The invention relates to a food sandwich and process of making same. More particularly, it relates to a sandwich with filling, such as a hotdog or wiener, and a minimum of bun compared to the quantity of filling. Further, the filling flavoring material, such as sauce or ketchup for the meat filling, can be put into the bun in a hole or pocket formed in the bun, and the flavoring material will not squirt or spill from the bun.

BACKGROUND OF THE INVENTION

This invention has particular application to weiner sandwiches, so it is described relative thereto. Wiener or hotdog types of sandwich, and other food sandwiches, are commonly known and very popular in today's food market. However, most of these sandwiches contain a large quantity of bun, compared to the quantity of meat or other filling, and it is undesirable to eat the large quantity of bun, both from a dietary standpoint and a taste standpoint. Further, most meat sandwiches known today are formed with a bun which does not securely retain the liquid flavoring material, such as ketchup. In these common types of meat sandwiches or hotdogs, when one is eating the sandwich, the ketchup or the like tends to spill out.

Improvements upon the aforementioned sandwiches are shown in U.S. Pat. Nos. 1,492,603 and 1,975,031. However, in those patented sandwiches there is still a large quantity of bun compared to the quantity of wiener or meat. Also, those patented sandwiches either do not provide for flavoring material, or they do not retain the liquid type of flavoring material in a manner to preclude spilling the flavoring, such as the ketchup, from the sandwich. Still further, the prior art sandwiches do not provide the compact, tasty, and quickly and easily made sandwiches shown in this document. Still further, the prior art sandwiches are not made by a process as convenient as that disclosed in this document, and the prior art sandwiches can not be mass produced and are not as tasty but yet inexpensive as the sandwich of this invention.

Accordingly, the objects and advantages of this invention are to provide a food sandwich which has a minimum quantity of bun compared to the quantity of filling. Further, the object and advantage of this invention is to provide a tasty sandwich which can be quickly and readily made, to supply requirements in large volumes and upon a moment's notice. Still further, the object and advantage of this invention is to provide a food sandwich which can contain a liquid type flavoring material, such as ketchup, and not have the ketchup squirt or spill from the sandwich when the sandwich is being handled or eaten. Still further, it is an object of this invention to provide a process for making the sandwich of the type heretofore referred to, and particularly to make a sandwich which is processed by cooking the sandwich in a bath of oil, to provide a food sandwich which has very unique, delicious, and tasty characteristics.

BRIEF DESCRIPTION OF THE DRAWINGS

FIG. 1 is a top plan view of one mold piece used in making the food sandwich.

FIG. 2 is a top plan view of another mold piece.

FIG. 3 is a top plan view of the mold piece of FIG. 2, but with the dough, a wiener, and skewer added.

FIG. 4 is a sectional view taken on the line 4—4 of FIG. 3, but with the top layer of dough added.

FIG. 5 is a perspective view of the meat sandwich prior to cooking.

FIG. 6 is an end view of the meat sandwich after it is cooked and with the skewer removed.

FIG. 7 is a top plan of the cooked meat sandwich, and with the meat flavoring dispenser shown therewith.

DETAILED DESCRIPTION OF THE PRODUCT AND PROCESS

The meat sandwich is preferably a hotdog or wiener type, so it will therefore be described in that regard, as shown in the drawings. FIGS. 1 and 2 respectively show the mold halves 10 and 11 which are substantially the same size and which mate together. The mold half 10 can be considered to be the upper half, and it has alignment pins 12 which fit into the holes 13 in the piece 11, which can be considered to be the lower half. The piece 10 has a mold cavity 14, and the piece 11 has a similar mold cavity 16. Further, mold half 10 has a second cavity 17, and the mold half 11 has its second cavity 18, and the cavities 17 and 18 are shown to be tapered, and they both terminate on the exterior of the mold, as shown at locations 19 and 21, respectively, on the mold pieces 10 and 11. The cavities described are also considered to be pockets, and it will therefore be seen that the mold halves can be placed together when the upper half 10 is inverted to cover the lower half 11, and the pocket for the meat is the larger pocket formed by the cavities 14 and 16, and it will then also be understood that the pockets 17 and 18 form one larger pocket which is contiguous to the meat pocket, for a purpose described later.

FIG. 3 shows mold lower half 11 covered by a thin layer of uncooked but edible dough 22, and the dough itself forms a cavity or pocket 23 as the dough rests snugly in the mold cavity or pocket 16. The meat, shown in the form of a wiener 24 is also shown in FIG. 3, and it substantially fully occupies the pocket 23, and in fact the wiener 24 extends above the upper mold surface 26, as shown in FIG. 4. Finally, FIG. 3 also shows a tapered skewer 27 which is laid over the dough 22 and in the pocket 28 formed by the dough 22 being snug in the mold cavity or pocket 18.

FIG. 4 then shows that the meat and skewer are covered by a layer of dough, and designated 29. The meat is therefore fully enclosed or encapsulated by the thin layer of dough, such as shown in the two layers 22 and 29, and the skewer is also encapsulated by the dough, except for the projecting end 31, as shown in FIG. 5. The thin layers of dough, as indicated 22 and 29, have their edges, as shown at 32, extending over the mold face 26. Molds 10 and 11 have cooperating knives and grooves, such as the knife 33 on the mold 10 and the mating groove 34 on mold 11. Thus when the dough layer 29 is placed in the cavity 14 and over the surface of the mold 10, and the mold 10 is inverted or brought to mating position with the mold 11, the dough layer 29 is positioned to encapsulate the wiener 24 and to enclose most of the skewer 27. At the time that the mold pieces 10 and 11 are pressed together, the assembly of the layers of dough, the meat, and the skewer, are all tightly compressed so that there is virtually no air or space inside the layers of dough 22 and 29. At the same time, the dough is trimmed along the extending edges 32, so that the resulting product is somewhat as shown in FIG. 5 with the minimum of extending edge 36 around the compressed assembly described.

Prior to cooking, the wiener and skewer hold the assembly in a condition which permits it to be handled without support from the mold, and the entire assembly can then be immersed in a bath of cooking oil which is not shown but is of the common and well-known process of frying in hot oil of a temperature of approximately 375° Fahrenheit.

The meat, such as the wiener 24, is preferably pre-cooked, so it is not further cooked in the oil, though the dough itself is completely cooked into a bun, as shown in FIGS. 6 and 7. Actually, FIGS. 6 and 7 somewhat exaggerate the edge 36 which would remain after the cooking, but these views are shown that way for descriptive purposes to identify with the remainder of the drawings of the dough prior to cooking. That is, it will be understood that the cooked bun will assume a more cylindrical shape, and the edges 36 will not be as pronounced and sharp as shown in FIGS. 6 and 7.

After the cooking described, the skewer 27 can be easily withdrawn from the cooked bun, referenced 37 in FIGS. 6 and 7, and this leaves the inlet opening 38 which is actually a continuation of the pocket in the bun as formed by the cavities 17 and 18 in the mold pieces. The pocket extends in contact with the wiener 24, as indicated in FIG. 7 and identified by numeral 39. Thus meat flavoring material, such as the ketchup 41, indicated in FIG. 7, can be injected into the pocket 39 and will therefore be in contact with the meat 24. A material flavoring dispenser 42 is shown for placing the sauce, ketchup, or other liquid flavoring or the like into the pocket 39. It will be understood that the dispenser 42 can be completely inserted into the pocket 39 to the lower end of 43, and then gradually withdrawn as the flavoring material itself is deposited in the pocket 39 and throughout the length of the pocket 39.

The resulting product is the hotdog or wiener sandwich with a minimum of bun and with a very easily handled sandwich which will not spill the liquid meat flavoring, and the flavoring is placed in contact with the meat. The thickness of the bun is no greater than one-fourth the diameter or thickness of the wiener 24, as the two ingredients are shown in FIG. 4. This provides for only a very minimum of bun compared to the quantity of meat. In actual practice, the dough layers 22 and 29 may be rolled out, and they are approximately one-sixteenth of an inch thick prior to the cooking or frying process mentioned. Also, the skewer 27 extends for substantially the full length of the wiener 24, and it may be to within perhaps ½ inch from the far end of the wiener 24, as indicated in FIG. 7. The meat flavoring may include solids, such as chopped onions, pickles, egg, as well as liquids of the ketchup and other sauce type. Still further, the pocket 39, as shaped by the tapered skewer 27, is tapered so that the sauce can be placed into the pocket 39 without trapping air therein as the sauce runs down one side or wall defining the pocket 39 and air can escape along the other side, all facilitated by the tapered shape of the pocket 39. With the prepared product as shown in FIG. 5, the cooking time is two minutes or less, and obviously the number of sandwiches that can be cooked in the cooking oil at the same time depends on the size of the container the cooking oil is contained in.

Of course in actual production of the sandwich, and in the process of making it, the mold would be a production type machine where one could place the layer of dough 22 over a lower mold half, place the wiener 24 and skewer 27, as shown in FIG. 3, and then place the dough layer 29 over the top, or simply fold an extending end of the lower layer 22 over the top, as shown in FIG. 4. Then an upper mold half could be pivotally mounted to be swung downwardly into the pressing and cutting position described, so that the ingredients would be provided in the form shown in FIG. 5. Whatever the actual mold or mechanical items be for forming the pre-cooked sandwich of FIG. 5, the significance is that the two chambers, the meat chamber 23 and the meat flavoring chamber 28 are contiguous, and the flavoring is easily contained in the resulting meat flavoring chamber 39 and the thickness of the bun is only that which is sufficient to hold the wiener 24 and the flavoring 41 in contact with each other without squirting or spilling out.

The references to meat sandwich also include fish and other food. However, the process described fundamentally cooks the dough, and at the same time it at least warms the meat.

Also, while the foregoing describes meat as the filling material, the food filling may be non-meat, such as cooked apples or other fruit. Then, ice cream or other suitable filling flavoring can be inserted into the contigious chamber 39 for flavoring the apples or other food in the chamber 23.

What is claimed is:

1. A process of making a food sandwich, comprising the steps of placing food filling and a skewer in contact with each other, forming the dough relative to the food filling and skewer to have only one end of the skewer extend exteriorly of the dough and to have the food filling completely encapsulated by the dough, cooking the dough with the food filling and skewer therein, removing the skewer from the cooked dough thereby forming a pocket contiguous to the food filling and with the pocket opening to the exterior of the cooked dough by the removal of the skewer, placing food filling flavoring material into the pocket and in contact with the food filling.

2. The sandwich making process of claim 1, including the steps of rolling the dough into a thin layer prior to enclosing the food filling and skewer with the dough, pressing the dough against the food filling and skewer to form a compact assembly of the food filling and skewer and dough, and cooking the dough by deep frying in a bath of cooking oil.

3. The sandwich making process of claim 2, including the steps of placing the rolled dough in a mold piece having a cavity to cover the cavity with the dough, placing the food filling onto the dough in the cavity, pressing the assembly into compact form by pressing another mold piece against the first mold piece and simultaneously trimming the dough in its extend beyond the cavity.

4. The sandwich making process of claim 1, including the steps of providing a thin layer of said dough, using an elongated meat wiener as said food filling, wrapping said wiener and said skewer with said thin layer of dough, and pressing said dough tightly against said wiener and said skewer prior to cooking.

* * * * *